G. BEY.
ROTARY PUMP.
APPLICATION FILED APR. 10, 1918.

1,287,844.

Patented Dec. 17, 1918.
2 SHEETS—SHEET 1.

WITNESSES

INVENTOR
George Bey
BY
ATTORNEYS

G. BEY.
ROTARY PUMP.
APPLICATION FILED APR. 10, 1918.
1,287,844.
Patented Dec. 17, 1918.
2 SHEETS—SHEET 2.
Fig. 3.  Fig. 4.
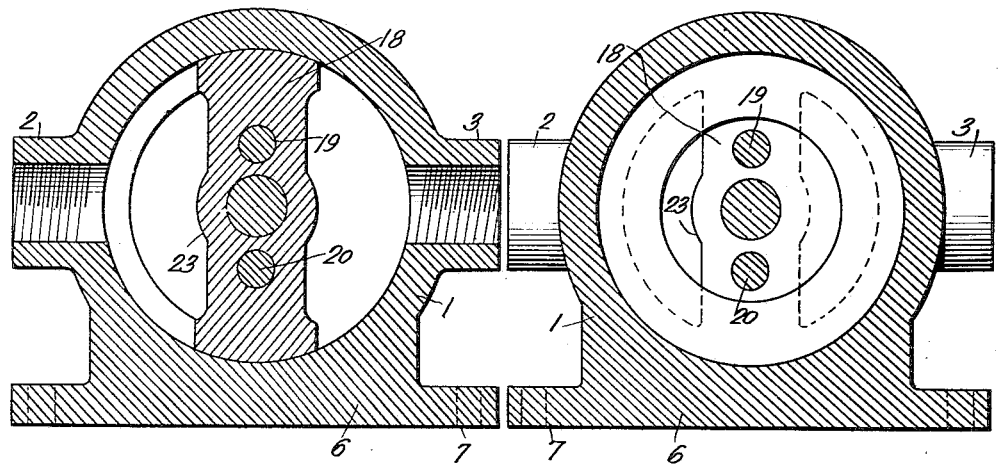
Fig. 5.  Fig. 6.
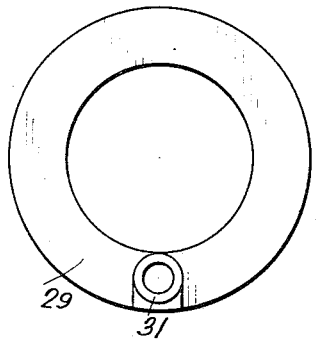 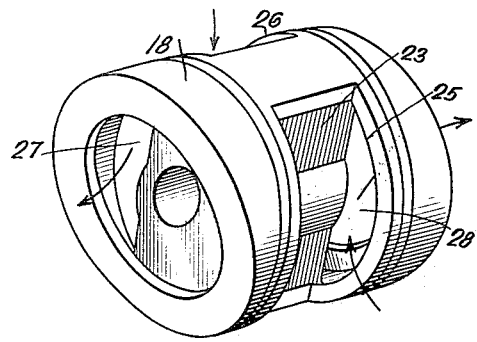
WITNESSES
INVENTOR
George Bey
BY
ATTORNEYS

UNITED STATES PATENT OFFICE.

GEORGE BEY, OF JERSEY CITY, NEW JERSEY.

ROTARY PUMP.

1,287,844. Specification of Letters Patent. Patented Dec. 17, 1918.

Application filed April 10, 1918. Serial No. 227,694.

*To all whom it may concern:*

Be it known that I, GEORGE BEY, a citizen of the United States, and a resident of Jersey City, in the county of Hudson and State of New Jersey, have invented a new and Improved Rotary Pump, of which the following is a full, clear, and exact description.

This invention relates to pumps and particularly to an improved combined reciprocating rotary pump, and has for an object the provision of an improved arrangement of wearing plate coacting with the piston of the pump.

Another object of the invention is the provision of means for adjusting the stroke of the pump when the pump is stationary or while it is in motion so as to regulate the flow of the pump.

A still further object of the invention is to rearrange and simplify certain parts of the pump shown in my copending application Serial No. 189,718, filed September 5, 1917.

In the accompanying drawings:

Fig. 3 is a transverse sectional view through Fig. 1 on line 3—3.

Fig. 4 is a transverse sectional view through Fig. 1 on line 4—4.

Fig. 5 is a front view of the thrust plate disclosing certain features of the invention.

Fig. 6 is a perspective view of the piston embodying certain features of the invention.

Figure 1:
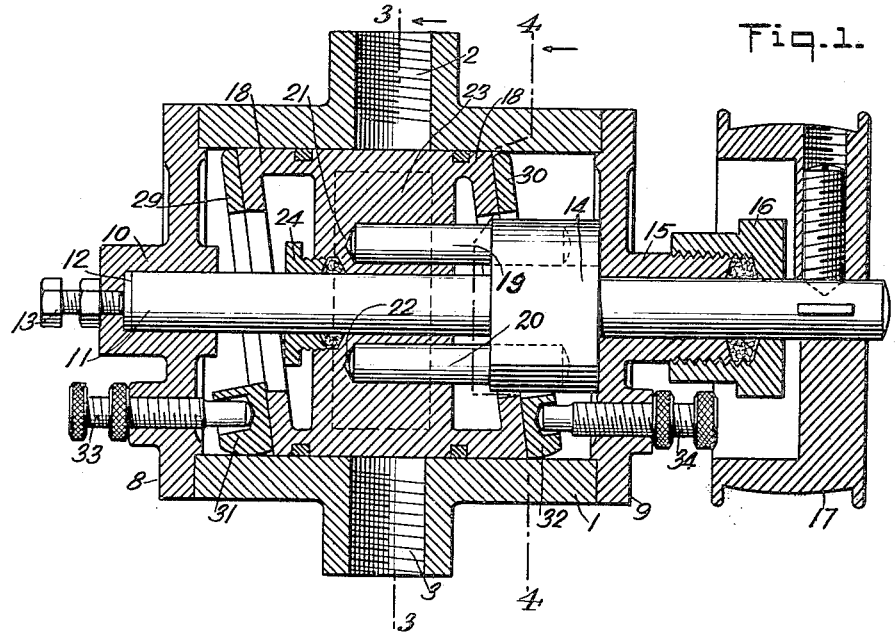
Figure 1 is a longitudinal vertical section through a pipe disclosing an embodiment of the invention.
Figure 2:
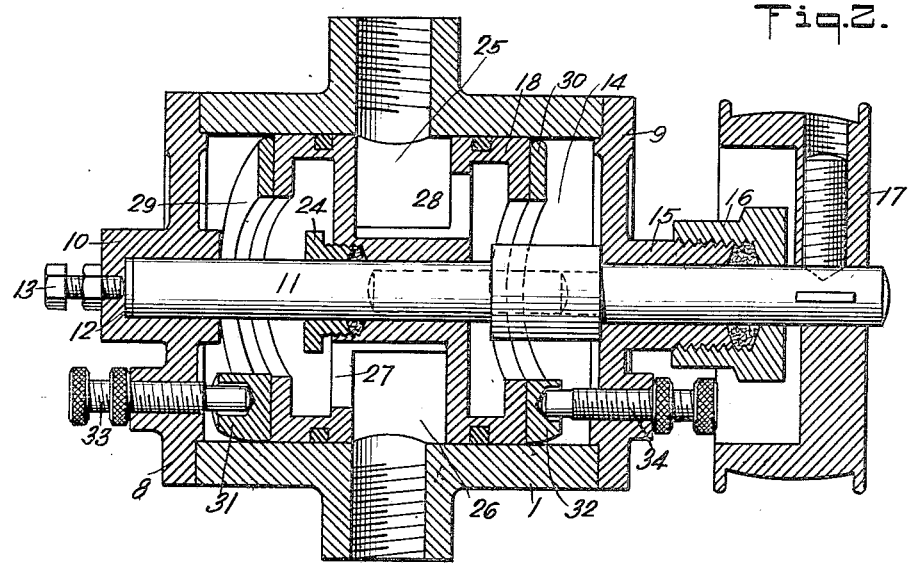
Fig. 2 is a view similar to Fig. 1, but showing the piston turned a half revolution.

Referring to the accompanying drawings by numerals, 1 indicates a casing formed of metal of any desired kind, and preferably provided with internally threaded enlargements or bosses 2 and 3. These bosses act as inlet and outlet openings respectively. In addition the casing 1 is preferably formed with a base 6 designed to receive suitable securing bolts or other securing members through the opening 7. The casing 1 is formed open at the ends and provided with heads 8 and 9 at the ends, said heads being secured in place by bolts or any other desired means. Head 8 is provided with a hub structure 10 in which the end of the shaft 11 rests as shown in Figs. 1 and 2, said end having a bearing or thrust plate 12 acting thereon which plate is in turn acted on by the adjusting screw 13 for taking up any loose longitudinal movement of the shaft.

Rigidly secured to shaft 11, or formed integral therewith is an enlargement 14 bearing against the head 9 and maintained in contact therewith by the set screw 13. The head 9 is provided with an exteriorly threaded hub 15 through which shaft 11 passes, said hub accommodating a packing box 16 for maintaining a tight joint. A driving pulley 17 is connected by a key, set-screw, or otherwise to the shaft 11 while power is transmitted to the shaft for rotating the same and from the shaft to the piston 18 hereinafter fully described. A pair of pins 19 and 20 are rigidly secured in any desired manner to the enlargement 14 so that they may rotate with the shaft. These pins extend loosely into bores 21 and 22 arranged in the central web 23 of the piston 18 whereby the piston is rotated with shaft 11, but allow an independent back and forth sliding movement of the rods 19 and 20 as well as the shaft 11. If desired a packing member 24 may be connected with the web 23 for preventing the passage of any fluid from the end of the casing carrying head 8 except through the proper discharge outlet. The piston 18 is provided with a central web as shown particularly in Fig. 6 in order to divide the inlet openings 25 and 26 as shown in Fig. 2. Inlet opening 26 is shown in this figure open to head 8 through the passageway 27, while the inlet 25 is open through passageway 28 to head 9. When the parts are in the position shown in Fig. 1 the web 23 is closing both the inlet and outlet openings, which are not only shown in this figure, but also shown in Fig. 3. During the rotation of the piston moved from the position shown in Fig. 3, it will cause water to flow in through the inlet opening and out through the outlet opening as the piston rotates and moves from one end of the casing toward the other. In order to vary the stroke of the piston thrust plates 29 and 30 are provided formed of metal of any desired kind and constructed with enlargements 31 and 32, each of these enlargements having an opening so as to accommodate the ends of screws 33 and 34. These screws are each provided with a locking nut and extend from the exterior of heads 8 and 9 to the interior of the casing so that they may be adjusted while the pump is running, or while it is standing still and locked by lock nuts in an adjusted position. If the screws 33 and 34 are shifted outwardly or unscrewed from the position shown in Fig. 1 for a short distance the stroke of the piston would be shortened to that extent and consequently the flow of the pump would be reduced proportionately. These thrust plates not only act in this manner to regulate the throw or reciprocation of the piston and consequently regulate the flow of the pump, but also act to take up any wear on the respective parts. It will be noted that during the rotation of the piston the same is moved back and forth by the action of the thrust plates which act in a certain sense as cams so that the alternate ends are opened and the inlet and outlet openings 2 and 3; whereby when one end is in communication with the inlet the same is filled with a fluid in the pump, while the other end is discharging. The distances at which the inner faces of the thrust plates opposite screws. 3 and 4 are spaced regulate the amount of throw or reciprocation of the piston. A half revolution of the piston reverses the action above mentioned and so on during the continued operation of the pump. By providing a piston discharge of this nature a gradual opening for the incoming fluid is formed, the outgoing fluid is positively forced out of the pump and the incoming fluid is drawn or sucked into the pump, thus producing a force pump without using a check valve or valves of any kind, as the piston and associate parts take the place of valves. It will also be noted that by reason of the particular construction set forth that the pump may be reversed at any time by reversing shaft 11, and in that event the inlet would become the outlet and the outlet would become the inlet.

What I claim is:

1. In a rotary pump of the character described, a casing, a piston arranged in said casing, means for causing said piston to reciprocate in the casing during its rotary movement, a thrust plate arranged at each end of the piston, and means for adjusting the position of one point of each of said thrust plates.

2. In a rotary pump of the character described, a casing, a piston arranged in said casing and formed with parallel ends, said casing being arranged at an angle to the axis of the piston, means for causing said piston to rotate in the casing, a pair of thrust plates arranged in the casing at opposite ends of the piston, and means for holding one point of each of the thrust plates in a given position for causing the piston to rotate and to reciprocate as it rotates.

3. A rotary pump of the character described, provided with an inlet and outlet, a rotary piston arranged in said casing formed with a passageway extending to opposite ends thereof, means for rotating said piston, means for reciprocating the piston whereby the matter being pumped will be drawn in at one end of the casing while other matter being pumped will be forced out of the other end, said last mentioned means comprising a pair of thrust plates, and means for substantially pivotally connecting the plates to the casing at alined points.

4. A rotary pump comprising a casing provided with an inlet and outlet, a rotatable piston arranged in said casing for drawing fluid in through said inlet and forcing the same out said outlet, said piston having parallel, but inclined ends, a thrust plate arranged adjacent each end of said piston, and an adjusting screw for each of said thrust plates for holding the same in an adjusted position, said screws being in alinement.

5. A rotary pump comprising a casing provided with inlet and outlet openings, end members connected with the casing, a power member extending into said casing, means for preventing longitudinal movement of the power member while permitting a rotary movement thereof, a piston slidingly mounted on said power member, means for transmitting power from the power member to the piston for rotating the piston, said piston having inclined parallel end faces, and an adjustable thrust plate coacting with each of said faces, the direction of adjustability of said faces being toward and from each other.

6. A rotary pump comprising a casing provided with inlet and outlet openings, a pair of end members, a rotary power shaft extending into said casing, a piston slidingly mounted on said power shaft, said piston being formed with parallel inclined faces, an opening extending from each face axially to near the center of the piston, said openings being spaced apart, and a radial opening extending from each of the first mentioned openings, said radial openings engaging the inlet and outlet openings respectively during the rotation of the piston, means for connecting the power member with the piston so that the power member will rotate therewith while reciprocating thereon, and a pair of thrust plates coacting with the end faces of said piston.

GEORGE BEY.